United States Patent
Pydin

(10) Patent No.: US 10,978,936 B2
(45) Date of Patent: Apr. 13, 2021

(54) COOLING APPARATUS OF DYNAMOELECTRIC MACHINE

(71) Applicant: Honda Motor Co., Ltd., Tokyo (JP)

(72) Inventor: Andrii Pydin, Wako (JP)

(73) Assignee: Honda Motor Co., Ltd.

( * ) Notice: Subject to any disclaimer, the term of this patent is extended or adjusted under 35 U.S.C. 154(b) by 455 days.

(21) Appl. No.: 16/038,957

(22) Filed: Jul. 18, 2018

(65) Prior Publication Data

US 2019/0044416 A1    Feb. 7, 2019

(30) Foreign Application Priority Data

Aug. 2, 2017 (JP) .............................. JP2017-150119

(51) Int. Cl.
| | |
|---|---|
| *H02K 5/20* | (2006.01) |
| *H02K 9/19* | (2006.01) |
| *B60K 1/00* | (2006.01) |
| *H02K 7/116* | (2006.01) |
| *B60K 11/02* | (2006.01) |
| *H02K 7/00* | (2006.01) |
| *H02K 5/22* | (2006.01) |
| *B60K 25/08* | (2006.01) |

(52) U.S. Cl.
CPC .................. *H02K 9/19* (2013.01); *B60K 1/00* (2013.01); *B60K 11/02* (2013.01); *B60K 25/08* (2013.01); *H02K 5/20* (2013.01); *H02K 5/225* (2013.01); *H02K 7/006* (2013.01); *H02K 7/116* (2013.01); *B60K 2001/006* (2013.01)

(58) Field of Classification Search
CPC ............ H02K 9/19; H02K 5/20; H02K 5/225; H02K 7/006; H02K 7/116; B60K 1/00; B60K 11/02; B60K 25/08
USPC ............................................... 310/54, 62, 63
See application file for complete search history.

(56) References Cited

U.S. PATENT DOCUMENTS 10,103,602 B2    10/2018   Kitta et al.

FOREIGN PATENT DOCUMENTS

| CN | 201033536 Y1 | 3/2008 | | |
|---|---|---|---|---|
| CN | 106487161 A | 3/2017 | | |
| JP | 2007116807 A | 5/2007 | | |
| JP | 2009089513 | * 4/2009 | ............... | H02K 9/19 |
| JP | 2010259207 A | 11/2010 | | |
| JP | 2013013194 A | 1/2013 | | |
| JP | WO2016197433 | * 12/2016 | ............... | B60K 1/00 |

* cited by examiner

*Primary Examiner* — Terrance L Kenerly
(74) *Attorney, Agent, or Firm* — Duft & Bornsen, PC

(57) ABSTRACT

A cooling apparatus of a dynamoelectric machine including a rotor and stator, wherein the dynamoelectric machine is mounted on a vehicle in a manner that an axial line of rotation thereof is oriented in a height direction of the vehicle. The cooling apparatus includes a hydraulic power source, a discharge port provided over a circumferential direction toward a space above a winding of the stator, a case configured in which the rotor and the stator are accommodated, and a coolant oil passage formed in the case so as to lead a coolant oil supplied from the hydraulic power source to the discharge port.

8 Claims, 7 Drawing Sheets

COOLING APPARATUS OF DYNAMOELECTRIC MACHINE

CROSS-REFERENCE TO RELATED APPLICATION

This application is based upon and claims the benefit of priority from Japanese Patent Application No. 2017-150119 filed on Aug. 2, 2017, the content of which is incorporated herein by reference.

BACKGROUND OF THE INVENTION

Field of the Invention

This invention relates to a cooling apparatus of a dynamoelectric machine mounted on a vehicle.

Description of the Related Art

Conventionally, there is a known apparatus for cooling a dynamoelectric machine mounted on an electric vehicle, hybrid vehicle or the like, in which coolant oil is circulated around a stator winding. In the apparatus of this type described in Japanese Unexamined Patent Publication No. 2010-259207 (JP2010-259207A), for example, a dynamoelectric machine is installed so that a rotating shaft thereof is placed along a horizontal direction. Further, coolant oil accumulated at a bottom part of a case is pumped up to a coolant outlet at a top part of the case and the coolant oil is discharged from the coolant outlet toward the stator winding to cool the dynamoelectric machine.

However, in the apparatus according to JP2010-259207A, it is difficult to cool the dynamoelectric machine uniformly in circumferential direction because a temperature gradient tends to occur between upper and lower portions of the dynamoelectric machine owing to the fact that the coolant oil is discharged from above the dynamoelectric machine with the rotating shaft oriented horizontally.

SUMMARY OF THE INVENTION

An aspect of the present invention is a cooling apparatus of a dynamoelectric machine. The dynamoelectric machine is mounted on a vehicle in a manner that an axial line of rotation thereof is oriented in a height direction of the vehicle, and includes a rotor and a stator concentric with the rotor. The stator includes a winding with a substantially cylindrical shape. The cooling apparatus includes a hydraulic power source, a discharge port provided over a circumferential direction toward a space above the winding, a case configured in which the rotor and the stator are accommodated, and a coolant oil passage formed in the case so as to lead a coolant oil supplied from the hydraulic power source to the discharge port.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
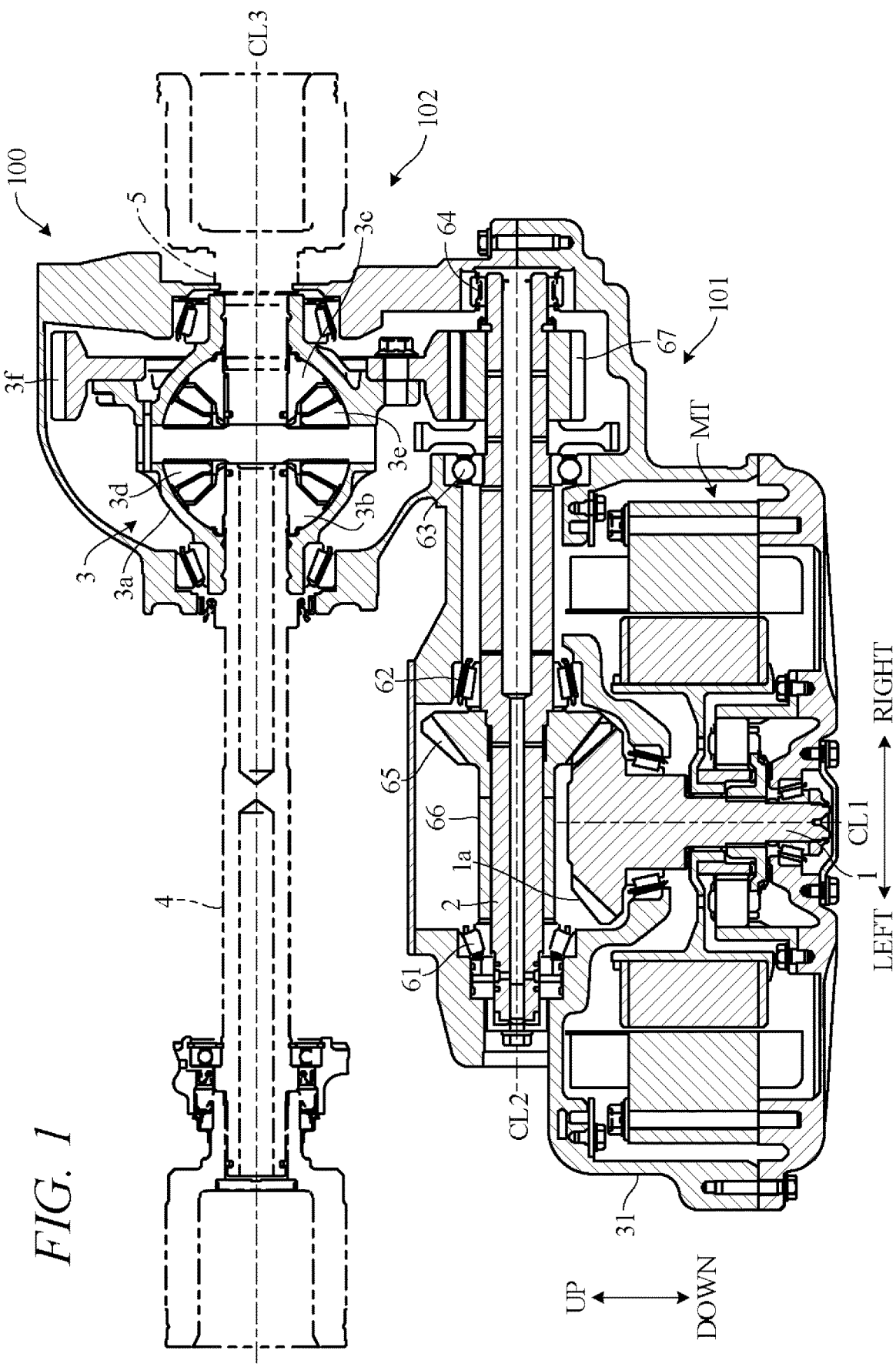
FIG. 1 is a cross-sectional diagram showing a developed view of main components of a vehicle drive unit to which a cooling apparatus of a dynamoelectric machine according to an embodiment of the present invention is applied.

Hereinafter, an embodiment of the present invention is explained with reference to FIGS. 1 to 7. In a cooling apparatus of a dynamoelectric machine according to the embodiment of the present invention, the dynamoelectric machine also usable as a generator is used as an electric motor for driving a vehicle. FIG. 1 is a cross-sectional diagram showing a developed view of main components of a vehicle drive unit 100 including a motor MT to which the cooling apparatus according to the embodiment of the present invention is applied. In FIG. 1, vehicle vertical (height) direction, i.e., up-down direction and lateral (width) direction, i.e., left-right direction are indicated by arrows.

First, a configuration of the vehicle drive unit 100 is explained. The vehicle drive unit 100 is mounted on an electric vehicle, hybrid vehicle or other vehicle having an electric motor as a drive (propulsion) power source. As shown in FIG. 1, the vehicle drive unit 100 includes a first drive unit 101 for converting and outputting torque of the motor MT as torque centered on a lateral axis CL2 and a second drive unit 102 for converting and outputting torque output from the first drive unit 101 as torque centered on a lateral axis CL3. Although the second drive unit 102 appears above the first drive unit 101 in the developed view of FIG. 1, the second drive unit 102 is actually situated forward or rearward of the first drive unit 101, and axis CL3 is located below axis CL2 (see FIGS. 3A and 3B).

As shown in FIG. 1, the vehicle drive unit 100 includes the motor MT, a first shaft 1 rotatably supported centered on a vertical axis CL1 extending in up-down direction inside the motor MT, a second shaft 2 rotatably supported centered on the axis CL2 orthogonal to the axis CL1, and a differential 3 rotatably supported centered on the axis CL3 parallel to the axis CL2. Torque from the motor MT is transmitted through the first shaft 1, second shaft 2 and differential 3 to left and right driveshafts 4 and 5, whereby left and right drive wheels are driven.

Figure 2:
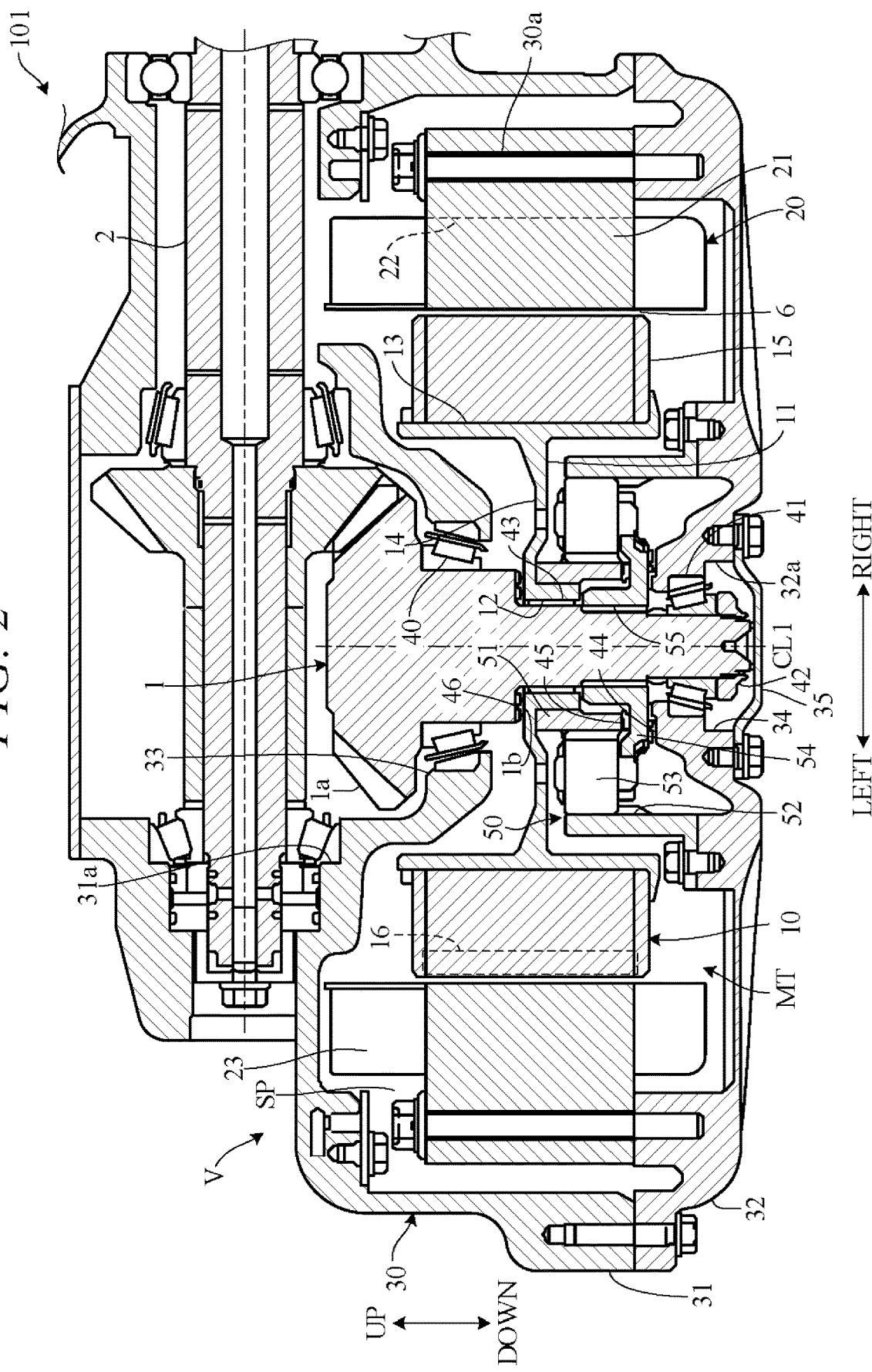
FIG. 2 is an enlarged view of a main part of the vehicle drive unit of FIG. 1.

FIG. 2 is an enlarged view of a main part of the first drive unit 101 of FIG. 1. As shown in FIG. 2, the motor MT includes a rotor 10 which rotates centered on the axis CL1 and a stator 20 located around the rotor 10. The rotor 10 and stator 20 are accommodated in a housing space SP inside a case 30.

The rotor 10 includes a rotor hub 11 and a rotor core 15. The rotor hub 11 includes a substantially cylinder-shaped shaft 12 centered on the axis CL1, a cylindrical member 13 of larger diameter than and coaxial with the shaft 12, and a substantially disk-shaped plate 14 which extends radially to connect the shaft 12 and cylindrical member 13. The rotor core 15 is a substantially cylinder-shaped rotor iron core centered on the axis CL1. The rotor core 15 is fitted on and fastened to an outer peripheral surface of the cylindrical member 13 of the rotor hub 11 so as to rotate integrally with the rotor hub 11. The motor MT is an interior permanent magnet synchronous motor, and multiple circumferentially spaced permanent magnets 16 are embedded in the rotor core 15. Alternatively, it is possible instead to use as the motor MT one having no magnets 16, such as a synchronous reluctance motor or switched reluctance motor.

The stator 20 has a substantially cylinder-shaped stator core 21 which is centered on the axis CL1 and disposed across a gap 6 of predetermined radial length from an outer peripheral surface of the rotor core 15. The stator core 21 is a fixed iron core whose inner peripheral surface is formed with multiple circumferentially spaced radially outward directed slots 22. A winding 23 (coil) is formed in the slots 22 as a concentrated winding or distributed winding. Upper and lower ends of the winding 23 protrude upward and downward of upper and lower ends of the stator core 21. The rotor 10 rotates when a revolving magnetic field is generated by passing three-phase alternating current through the winding 23.

The case 30 includes vertically disassemblable upper and lower cases members 31 and 32. The stator core 21 is fastened to the lower case 32 by through-bolts 30a. An opening 31a centered on the axis CL1 is formed at a center portion of the upper case 31, and an opening 32a centered on the axis CL1 is formed at a center portion of the lower case 32. A shaft support 33 is formed in the opening 31a of the upper case 31 to extend downward and radially inward. A shaft support 34 is formed in the opening 32a of the lower case 32 to extend upward and radially inward.

An outer peripheral surface of the first shaft 1 is rotatably supported on these shaft supports 33 and 34 via tapered roller bearings 40 and 41, respectively. A nut 42 fastened to a lower end portion of the first shaft 1 restrains the first shaft 1 in vertical direction. A cover 35 is attached to a bottom surface of the lower case 32 so as to close the opening 32a from outside. An inner peripheral surface of the shaft 12 of the rotor hub 11 is relatively rotatably supported on the outer peripheral surface of the first shaft 1 via a needle bearing 43.

A planetary gear mechanism 50 is interposed in a torque transmission path between the rotor 10 and the first shaft 1. The planetary gear mechanism 50 includes a sun gear 51 and a ring gear 52, both of substantially cylinder shape centered on the axis CL1, multiple circumferentially spaced planetary gears 53 disposed between the sun gear 51 and the ring gear 52, and a substantially cylinder shaped carrier 54 which is centered on the axis CL1 and rotatably supports the planetary gears 53. A needle bearing 44 is interposed between a top surface of the shaft support 34 and a bottom surface of the carrier 54, whereby the carrier 54 is relatively rotatably supported with respect to the shaft support 34. A needle bearing 45 is interposed between a top surface of the carrier 54 and a bottom surface of the sun gear 51, whereby the sun gear 51 is relatively rotatably supported with respect to the carrier 54.

An inner peripheral surface of the sun gear 51 is spline-fitted on an outer peripheral surface of the shaft 12 of the rotor hub 11, whereby rotation of the rotor 10 is transmitted to the sun gear 51. The ring gear 52 is fixed to an upper surface of the lower case 32. The planetary gears 53 are engaged with the sun gear 51 and the ring gear 52, whereby rotation of the sun gear 51 is transmitted through the planetary gears 53 to the carrier 54. The carrier 54 has a substantially cylinder-shaped shaft 55 centered on the axis CL1. The shaft 55 is of smaller diameter than the sun gear 51, and an inner peripheral surface of the shaft 55 is spline-fitted on the outer peripheral surface of the first shaft 1 below the needle bearing 43 and above the tapered roller bearing 41, whereby rotation of the carrier 54 is transmitted to the first shaft 1.

A bevel gear 1a of larger diameter than the tapered roller bearing 40 is formed on an upper end portion of the first shaft 1 above the tapered roller bearing 40. Alternatively, the bevel gear 1a can be provided as a separate body from the first shaft 1 and integrally joined to the outer peripheral surface of the first shaft 1 by spline-fitting or the like. A step 1b is provided on the outer peripheral surface of the first shaft 1, whereby diameter of the outer peripheral surface is reduced below the step 1b. A needle bearing 46 is interposed between a top surface of the plate 14 of the rotor hub 11 and a bottom surface of the step 1b, whereby the first shaft 1 is relatively rotatably supported with respect to the rotor hub 11.

As shown in FIG. 1, the second shaft 2 is rotatably supported on the upper case 31 by a pair of left and right tapered roller bearings 61 and 62 installed diagonally left-upward and diagonally right-upward of the bevel gear 1a of the first shaft 1 and by a ball bearing 63 and a roller bearing 64 installed rightward of the tapered roller bearing 62. The second shaft 2 is inserted along inner peripheral surfaces of a bevel gear 65 and a spacer 66, both of substantially cylinder-shape centered on the axis CL2, which are installed between the left and right tapered roller bearings 61 and 62. At the time of the insertion, the inner peripheral surface of the bevel gear 65 is spline-fitted on an outer peripheral surface of the second shaft 2, whereby the second shaft 2 rotates integrally with the bevel gear 65. Rotation of the first shaft 1 is therefore transmitted through the bevel gears 1a and 65 to the second shaft 2. A spur gear 67 is spline-fitted on the outer peripheral surface of the second shaft 2 between the ball bearing 63 and roller bearing 64, whereby the spur gear 67 rotates integrally with the second shaft 2.

The differential 3 includes a differential case 3a and multiple gears housed in the differential case 3a, i.e., a pair of left and right side gears 3b and 3c respectively attached to the pair of left and right drive shafts 4 and 5, and a pair of pinion gears 3d and 3e which engage the side gears 3b and 3c. An input gear 3f fixed on the differential case 3a engages the spur gear 67 fastened to the second shaft 2, whereby torque of the second shaft 2 is transmitted through the spur gear 67 and input gear 3f to the differential case 3a. Therefore, the differential case 3a rotates around the axis CL3, and the drive shafts 4 and 5 are driven.

Thus in the present embodiment, the vehicle drive unit 100 is configured with the axis of rotation CL1 of the motor MT oriented in vehicle height direction, whereby overall height of the vehicle drive unit can be reduced as compared with a vehicle drive unit whose axis of rotation CL1 is oriented horizontally. A large diameter motor required for developing high output can therefore be easily installed in a height-restricted space of a vehicle.

Figure 3A:
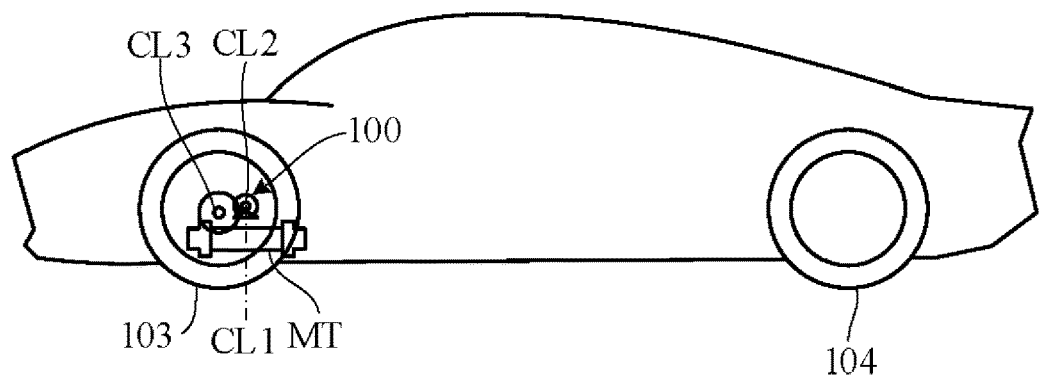
FIG. 3A is a diagram showing a first example of installing the vehicle drive unit of FIG. 1 in the vehicle.
Figure 3B:
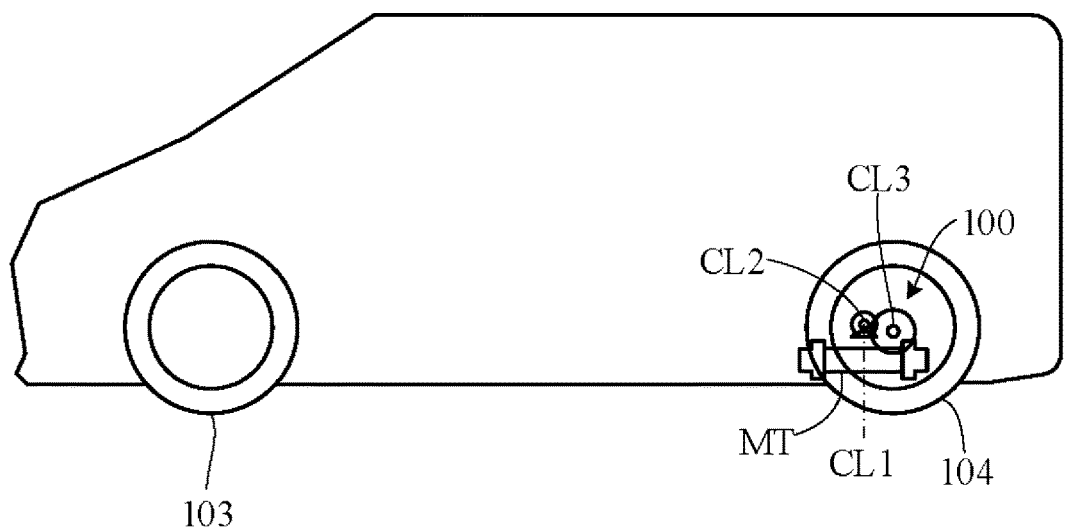
FIG. 3B is a diagram showing a second example of installing the vehicle drive unit of FIG. 1 in the vehicle.

FIGS. 3A and 3B are diagrams showing examples of installation of the vehicle drive unit 100 in vehicles. FIG. 3A shows an example of installing the vehicle drive unit 100 between left and right front wheels 103 for use as a front wheel drive unit. FIG. 3B shows an example of installing the vehicle drive unit 100 between left and right rear wheels 104 for use as a rear wheel drive unit. In either example, a top surface of the motor MT is located below the axis of rotation CL3 of the drive wheels 103 or 104. Therefore, when the vehicle drive unit 100 is installed toward the front of the vehicle as shown in FIG. 3A, height of the vehicle hood can be lowered to realize enhanced superiority of design and the like. Further, when the vehicle drive unit 100 is installed toward the rear of the vehicle as shown in FIG. 3B, no need arises to raise the floor surface inside the vehicle, so that reduction of vehicle roominess can be avoided.

Moreover, in the present embodiment, since the vehicle drive unit 100 is installed with the axis of rotation CL1 of the motor MT oriented in vehicle height direction, a cooling apparatus can be configured as set out below so as to cool the motor MT uniformly in circumferential direction.

Figure 4:
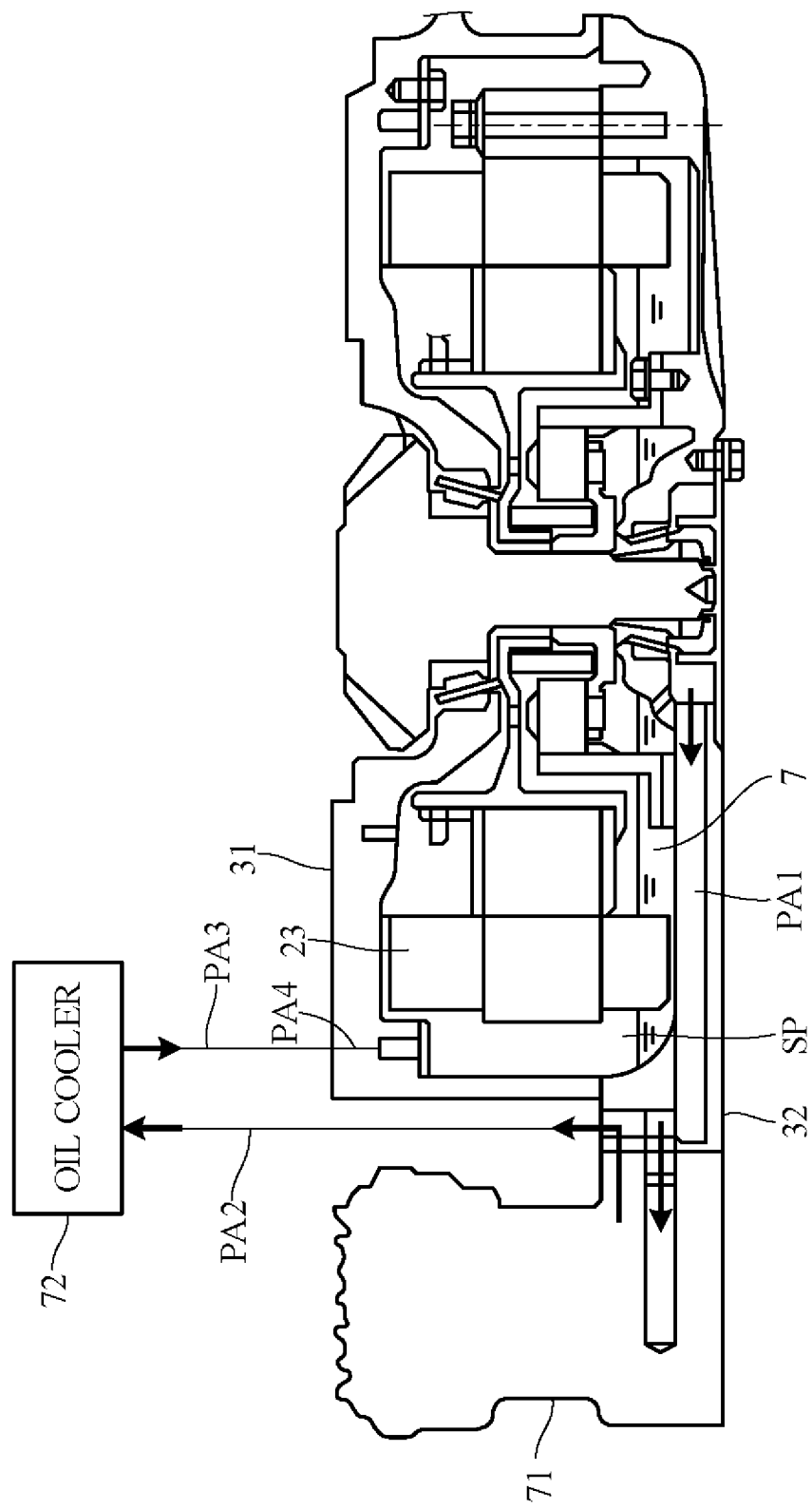
FIG. 4 is a diagram schematically illustrating overall configuration of the cooling apparatus of the dynamoelectric machine according to the embodiment of the present invention.

FIG. 4 is a diagram schematically illustrating overall configuration of the cooling apparatus of the dynamoelectric machine according to an embodiment of the present invention. FIG. 4 shows a motor MT cross-section at a different site (phase) from FIG. 2.

As shown in FIG. 4, a hydraulic pump 71 is attached to a side surface of the lower case 32 of the motor MT. As indicated by an arrows in FIG. 4, the hydraulic pump 71 sucks in oil 7 collected at a bottom portion in the case 30 (housing space SP) through an oil passage PA1 formed in the lower case 32 and delivers it through an oil passage PA2 to an oil cooler 72. Oil cooled by the oil cooler 72 is sent through an oil passage PA3 and an oil passage PA4 formed in the upper case 31 and discharged toward an upper end portion of the winding 23, thereby cooling the winding 23. Although oil discharged from the hydraulic pump 71 is also supplied to other sites as coolant oil, lubricating oil or hydraulic oil, these aspects are not illustrated in FIG. 4.

Figure 5:
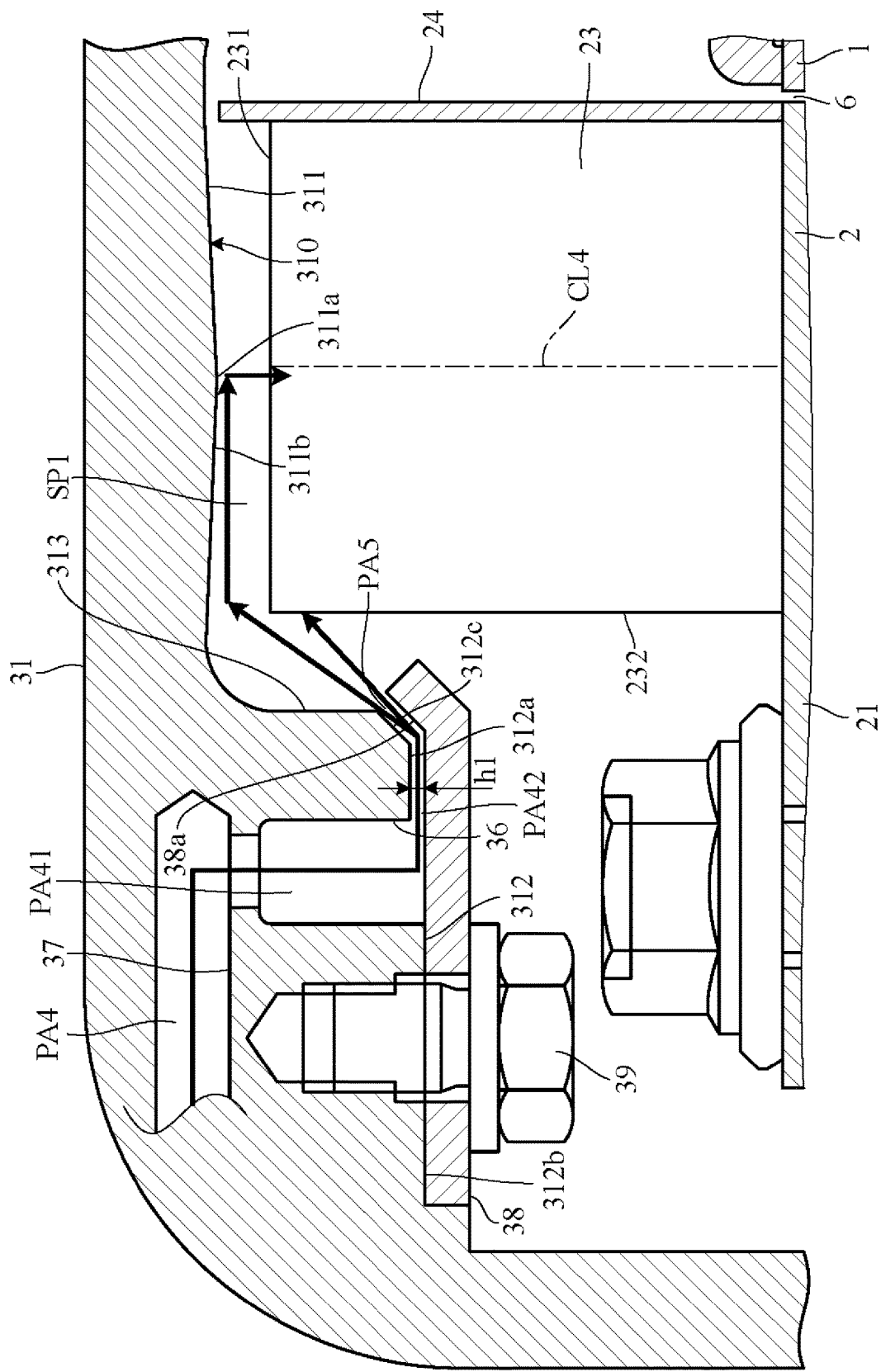
FIG. 5 is an enlarged view of main components of the cooling apparatus of the dynamoelectric machine according to the embodiment of the present invention.

FIG. 5 is an enlarged view (enlarged view of section V of FIG. 2) of main components of the cooling apparatus of the dynamoelectric machine according to the embodiment of the present invention, particularly focused on details of the oil passage PA4 formed in the upper case 31. As shown in FIG. 5, an upper surface 310 inside the upper case 31 includes a substantially ring-shaped first upper surface 311 provided to face a top surface 231 of the winding 23 and extend full circumference, a substantially ring-shaped second upper surface 312 provided radially outward of the first upper surface 311 to extend full circumference at lower level than the first upper surface 311, and a substantially cylinder-shaped inner peripheral surface 313 centered on the axis CL1 (FIG. 2) which connects a radially outer edge of the first upper surface 311 and a radially inner edge of the second upper surface 312. The inner peripheral surface 313 is provided so as to face an outer peripheral surface 232 of the winding 23.

A substantially ring-shaped groove 36 centered on axis CL1 is formed in the second upper surface 312 to extend full circumference. Height of the second upper surface 312 radially inward of the groove 36 (radially inward upper surface 312a) is formed higher than height of the second upper surface 312 radially outward of the groove 36 (radially outward upper surface 312b) by a predetermined height h1. A radially inward corner of the radially inward upper surface 312a is provided with a chamfer 312c sloping toward the upper end portion of the winding 23 at a predetermined angle with respect to horizontal (for example, about 45° to 60°). A single hole 37 is formed in the upper case 31 to extend radially outward from above the groove 36. The hole 37 constitutes part of the oil passage PA4. One end portion of the hole 37 communicates with the groove 36 and another end portion of the hole 37 communicates with the oil passage PA3 (FIG. 4) outside the upper case 31.

A substantially ring-shaped plate 38 is attached to the second upper surface 312 (radially outward upper surface 312b) by bolts 39. The plate 38 completely covers the groove 36 and radially inward upper surface 312a from underneath, and an inner radial end portion thereof is formed to bend diagonally upward parallel to the chamfer 312c, thereby providing the plate 38 with an inclined surface 38a lying parallel to the chamfer 312c. As a result, an annular oil passage PA41 and a communicating oil passage PA42 constituting part of the oil passage PA4 are formed between the plate 38 and the groove 36 and between the plate 38 and the radially inward upper surface 312a. Moreover, at an inner radial end portion of the communicating oil passage PA42, a discharge port PA5 is formed in the whole circumference as directed toward an upper space SP1 between the top surface 231 of the winding 23 and the first upper surface 311. Therefore, as indicated by arrows in FIG. 5, oil (coolant oil) discharged from the hydraulic pump 71 (FIG. 4) is delivered through the annular oil passage PA41 and the communicating oil passage PA42 to be discharged radially inward and diagonally upward from the discharge port PA5 around the entire circumference of the winding 23.

Some of the coolant oil discharged from the discharge port PA5 is sprayed onto the upper end portion of the winding 23 and the remainder of the coolant oil is sprayed onto the first upper surface 311. The first upper surface 311 is provided with sloped surface 311b which incline downward toward a vertex 311a at a lowermost part of the first upper surface 311 at a gentle angle with respect to horizontal (for example, about 3° to 5°). The vertex 311a locates on a center line CL4 passing vertically through a radially central region of the winding 23 or on a vertical line near the center line CL4. As indicated by an arrow in FIG. 5, the coolant oil sprayed onto the first upper surface 311 flows along the sloped surface 311b to the lowermost vertex 311a, from where it falls toward the radially central region of the top surface 231 of the winding 23. Therefore, coolant oil is supplied onto the radially center region at the upper end portion of the winding 23, and the winding 23 can be efficiently cooled.

A cylinder-shaped partition plate 24 centered on the axis CL1 is erected upward from a top surface of the stator core 21 to extend along an inner peripheral surface of the stator core 21. An upper end portion of the partition plate 24 protrudes above the top surface 231 of the winding 23. This prevents coolant oil discharged from the discharge port PA5 from flowing into the gap 6 between the stator 20 and the rotor 10.

Thus in the present embodiment, the discharge port PA5 directed toward the upper space SP1 of the winding 23 is provided completely around the circumference of the upper end portion of the winding 23, and oil discharged from the hydraulic pump 71 and delivered through the annular oil passage PA41 and the communicating oil passage PA42 between the upper case 31 and the plate 38 is discharged from the discharge port PA5 toward the first upper surface 311. Therefore, it is possible to supply the coolant oil from around the entire circumference of the winding 23, and to uniformly cool the whole winding 23.

Figure 6:
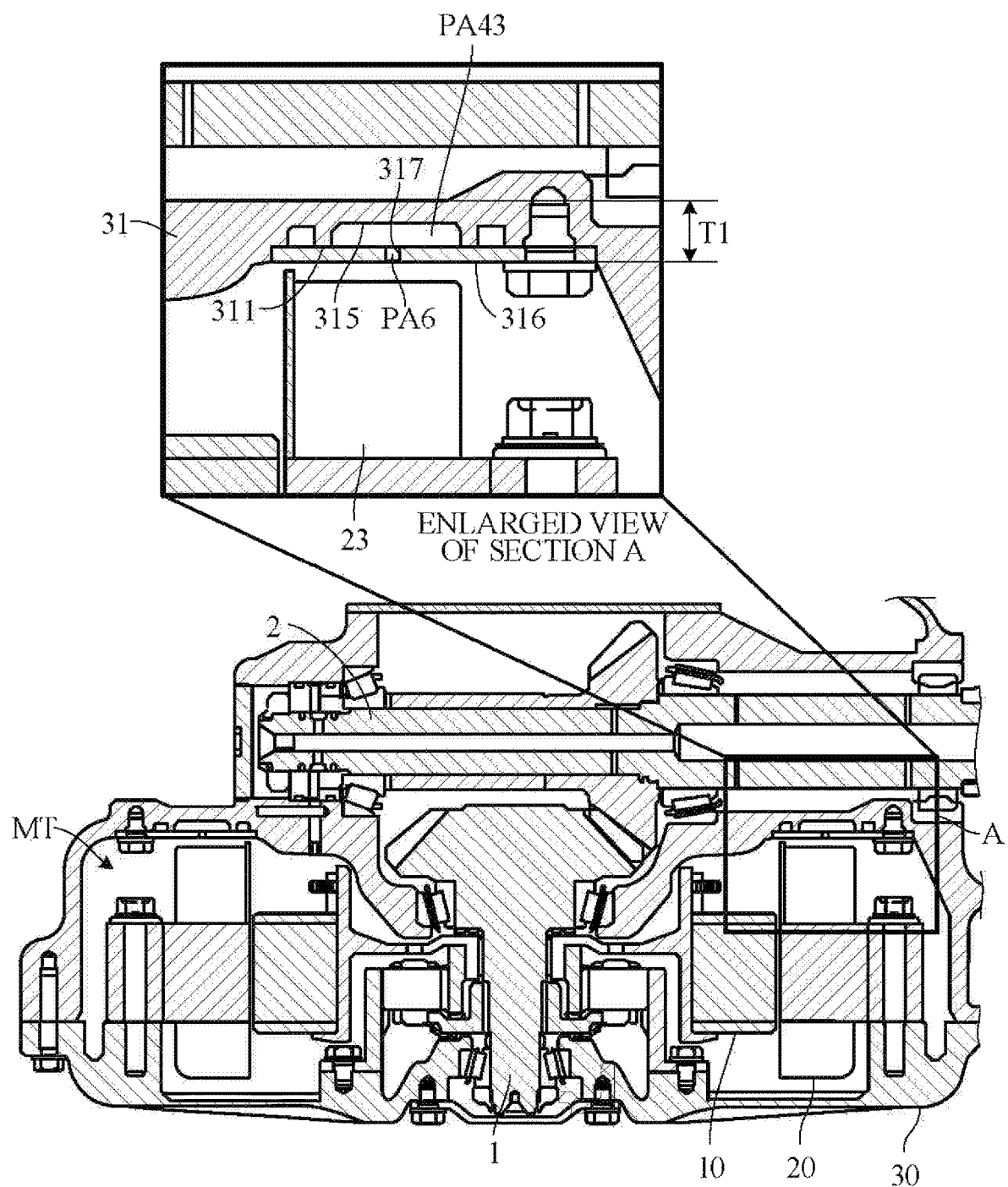
FIG. 6 is a diagram showing a modification of the cooling apparatus of the dynamoelectric machine according to the embodiment of the present invention.

FIG. 6 is a diagram showing a modification of the cooling apparatus of the present embodiment. FIG. 6 includes an enlarged view of section A in the vicinity of the upper end portion of the winding 23. As shown in the enlarged view of section A in FIG. 6, an annular groove 315 centered on the axis CL1 is formed in the upper surface 311 of the upper case 31 above the winding 23, a ring-shaped plate 316 is attached so as to close the annular groove 315, and multiple circumferentially spaced through-holes 317 are formed completely around the plate 316. As a result, an annular oil passage PA43 and discharge ports PA6 (through-holes 317) constituting part of the coolant oil passage PA4 are provided above the winding 23, whereby coolant oil can be supplied through the annular oil passage PA43 and the discharge ports PA6 onto the upper end portion of the winding 23 uniformly in circumferential direction.

Figure 7:
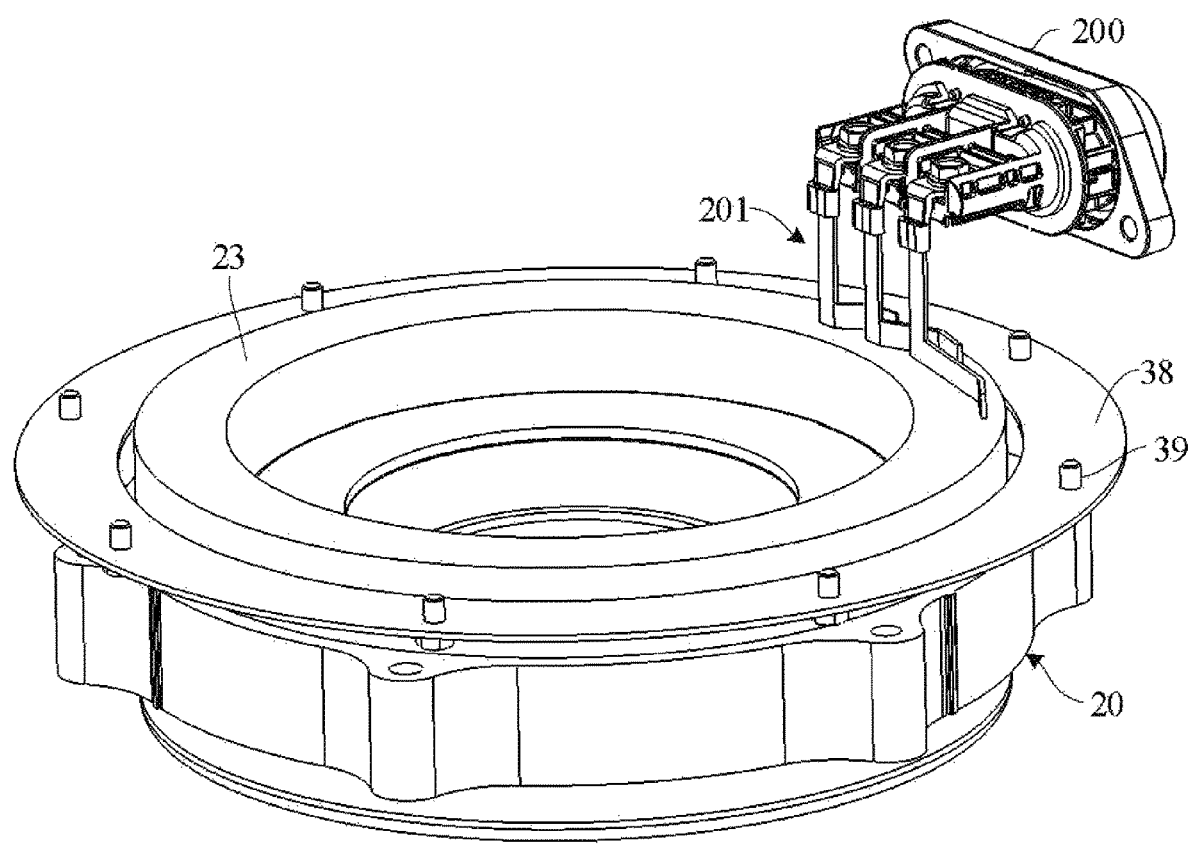
FIG. 7 is a perspective view showing a main configuration of the cooling apparatus of FIG. 5.

The embodiment of FIG. 5 provides the coolant oil passage PA4 not above but sideways (radially outward) of the winding 23 so that, compared to the modification of FIG. 6, it enables the upper case 31 above the winding 23 to be made thin and thereby minimize height of the upper surface of the motor MT. Moreover, as shown in FIG. 7 which is a perspective view of the stator 20 and plate 38 of the FIG. 5, the provision of the oil passage forming plate 38 around the upper end portion of the winding 23 ensures that three-phase lines 201 connected to a connector 200 for supplying power to the winding 23 can be easily connected to the winding 23 free of interference with the plate 38.

In contrast, in the modification of FIG. 6, the coolant oil passage PA4 (annular oil passage PA43) is provided above the winding 23, so that thickness T1 of the upper case 31 needs to be increased by the thicknesses of the annular oil passage PA43 and the plate 316, and the height of the upper surface of the motor MT therefore becomes higher than that of the FIG. 5. Moreover, interference between the three-phase lines 201 and the plate 316 caused by the provision of the plate 316 above the winding 23 makes connection of the three-phase lines 201 to the winding 23 more difficult than in the FIG. 5.

According to the embodiment, the following operations and effects can be achieved.

(1) The electric motor MT of the embodiment includes the rotor 10 and the substantially cylinder-shaped stator 20 provided with the winding 23 and installed concentric with the rotor 10 (FIG. 2). The motor MT is installed in a vehicle with its axis of rotation CL1 oriented in vehicle height direction (FIG. 2). The cooling apparatus includes the hydraulic pump 71, the discharge port PA5 or discharge ports PA6 which open toward the space SP1 above the winding 23 over the whole circumference thereof, the case 30 in which the rotor 10 and the stator 20, and the coolant oil passage PA4 (PA41, PA42, PA43) which is formed in the case 30 and leads coolant oil discharged from the hydraulic pump 71 to the discharge port PA5 or discharge ports PA6 (FIGS. 4 to 6).

Owing to this configuration, coolant oil can be supplied to the upper end portion of the winding 23 completely therearound. Therefore, the motor MT can be cooled uniformly in circumferential direction, and its cooling performance is enhanced. Although it is necessary to be switched to an operating mode which forcibly restricts motor output, when the motor MT overheats, the present embodiment can prevent switching to such a mode because it adequately restrains motor temperature rise.

(2) The stator 20 is installed around the rotor 10 (FIG. 2). The case 30 includes the upper case 31 which covers the rotor 10 and stator 20 from above and has the inner peripheral surface 313 and first upper surface 311 respectively disposed facing the outer peripheral surface 232 and top surface 231 of the upper end portion of the winding 23 (FIG. 5). The discharge port PA5 is open and directed toward the first upper surface 311 over the whole circumference at the inner peripheral surface 313 at an upper part of the upper case 31, and the coolant oil passage PA4 includes the annular oil passage PA41 provided around the discharge port PA5 and the communicating oil passage PA42 for communicating the annular oil passage PA41 with the discharge port PA5 (FIG. 5). Therefore, coolant oil discharged from the discharge port PA5 surrounding the winding 23 can be deflected off the first upper surface 311 onto the top surface 231 of the winding 23. Since this eliminates the need for the annular oil passage PA43 and plate 316 above the winding 23, such as shown in FIG. 6, height of the upper surface of the motor MT can be kept low and connection of the three-phase lines 201 to the top surface 231 of the winding 23 is facilitated (FIG. 7).

(3) The upper case 31 is a case member whose interior includes the first upper surface 311, the inner peripheral surface 313 extending downward from the outer radial end portion of the first upper surface 311, and the second upper surface 312 extending radially outward of the inner peripheral surface 313 at a lower level than the first upper surface 311, and the cooling apparatus includes the plate 38 attached to the second upper surface 312 (FIG. 5). The annular oil passage PA41, communicating oil passage PA42 and discharge port PA5 are formed between the second upper surface 312 and the plate 38 (FIG. 5). This simplifies formation of the annular oil passage PA41 around the winding 23 and enables uniform supply of coolant oil to the winding 23 in the circumferential direction.

(4) The chamfer 312c is formed on the inner radial end portion of the second upper surface 312, and the inner radial end portion of the plate 38 has the inclined surface 38a lying parallel to the chamfer 312c (FIG. 5). Therefore, the discharge port PA5 can be easily formed to point toward the first upper surface 311.

(5) The first upper surface 311 of the upper case 31 facing the top surface 231 of the winding 23 has the sloped surface 311b which incline toward a central portion of the thickness in the radial direction of the top surface 231 of the winding 23 (toward center line CL4) (FIG. 5). Since this enables supply of coolant oil to the radially central region of the top surface 231 of the winding 23, the whole winding 23 can be efficiently cooled.

(6) The stator 20 includes the partition plate 24 extending along the inner peripheral surface at the boundary with the rotor 10 to protrude above the top surface 231 of the winding 23 (FIG. 5). Since this prevents coolant oil discharged diagonally upward from the discharge port PA5 from flowing into the gap 6 between the rotor 10 and the stator 20, smooth rotation of the rotor 10 is ensured.

(7) When the motor MT is used as a vehicle drive unit for driving the front wheels 103 or rear wheels 104 of a vehicle (FIG. 1), the top surface of the motor MT is located below the axis CL3 connecting the left and right drive wheels 103 or 104 (FIGS. 3A and 3B). As a result, the motor MT can be compactly installed in a vehicle with no loss of vehicle design performance or interior space performance. The motor MT can therefore be favorably utilized in an electric vehicle or hybrid vehicle as a dynamoelectric machine (electric motor or generator) exhibiting excellent cooling performance.

Although in the above embodiment (FIG. 2) the rotor 10 is disposed inside the stator 20 as an inner rotor, it can instead be disposed outside the stator 20 as an outer rotor, and a dynamoelectric machine having the rotor 10, stator 20 and case 30 (a case member) can be of any configuration insofar as it is mounted on a vehicle with the axis of rotation CL1 oriented in vehicle height direction. The case member can be arranged so that the axis CL2 is oriented not in vehicle lateral direction but in vehicle front-rear direction. The axis CL1 and axis CL2 can intersect at an angle other than 90°. Although the electrically powered hydraulic pump 71 is used as a hydraulic power source in the above embodiment (FIG. 4), the hydraulic power source is not limited to this configuration.

In the above embodiment (FIG. 5), the annular groove 36 and the radially inward upper surface 312a higher than the radially outward upper surface 312b by predetermined height h1 are formed in the second upper surface 312 of the upper case 31, and the coolant oil passage PA4 for leading oil discharged from the hydraulic pump 71 to the discharge port PA5 is formed between the groove 36 and the plate 38 and between the radially inward upper surface 312a and the plate 38. However, the coolant oil passage is not limited to the above configuration. For example, it is possible to form multiple circumferentially spaced through-holes in radial direction from the inner peripheral surface 313 of the upper case 31 to the annular groove 36 and configure communicating oil passages and discharge ports by means of these through-holes. It is also possible to form an annular groove in the plate 38 by concave and convex machining and use this annular groove as an annular oil passage. Therefore, the upper case 31 and the plate 38 serving as a case member and the plate member constituting an upper case as part of a case are not limited to the above configuration. Optionally, the coolant oil passage PA4 can be configured without using the plate 38.

In the above embodiment (FIG. 5), the first upper surface 311 of the upper case 31 is provided with the sloped surface 311b which incline toward the center portion of a thickness in the radial direction of the top surface 231 of the winding 23. However, it is possible instead, for example, to replace the sloped surface regions 311b with steps or protuberances for leading coolant oil discharged from the discharge port PA5 to the center portion of the thickness in the radial direction of the top surface 231. Therefore, the first upper surface is not limited to the above configuration. In the above embodiment (FIG. 5), the partition plate 24 is provided along the inner peripheral surface of the stator 20. However, a projection projected above the top surface 231 of the winding 23 at a boundary between the stator 20 and the rotor 10 is not limited to this configuration.

In the above embodiment (FIG. 2), the first shaft 1 is provided at a center portion of the rotor 10 to be integrally rotatable with the rotor 10 and the bevel gear 1a (also called a first bevel gear) is provided on the upper end portion of the first shaft 1. However, a first rotating member is not limited to this configuration. In the above embodiment (FIG. 1), the laterally extending second shaft 2 is provided, and the bevel gear 65 (also called a second bevel gear) engaging with the bevel gear 1a is provided to be integrally rotatable with the second shaft 2. However, a second rotating member is not limited to this configuration.

Although an example of applying the cooling apparatus of the dynamoelectric machine to the vehicle drive unit 100 is described in the foregoing, a cooling apparatus of a dynamoelectric machine according the present invention can be similarly applied to other types of dynamoelectric machines. Therefore, the cooling apparatus of the dynamoelectric machine is not limited to installation as shown in the above examples (FIGS. 3A and 3B) but can also be installed at various other vehicle locations.

The above embodiment can be combined as desired with one or more of the above modifications. The modifications can also be combined with one another.

According to the present invention, coolant oil can be supplied to a winding of a dynamoelectric machine from around the entire circumference of the winding, and the dynamoelectric machine can be cooled uniformly in circumferential direction.

Above, while the present invention has been described with reference to the preferred embodiments thereof, it will be understood, by those skilled in the art, that various changes and modifications may be made thereto without departing from the scope of the appended claims.

What is claimed is:

1. A cooling apparatus of a dynamoelectric machine, the dynamoelectric machine being mounted on a vehicle in a manner that an axial line of rotation thereof is oriented in a height direction of the vehicle, the dynamoelectric machine including a rotor and a stator concentric with the rotor, the stator including a winding with a substantially cylindrical shape, the cooling apparatus comprising:
a hydraulic power source;
a discharge port provided over a circumferential direction toward a space above the winding;
a case in which the rotor and the stator are accommodated; and
a coolant oil passage formed in the case so as to lead a coolant oil supplied from the hydraulic power source to the discharge port, wherein
the stator is configured to surround the rotor,
the case includes an upper case configured to cover the rotor and the stator from above,
the upper case includes an inner peripheral surface and an inner upper surface respectively facing an outer peripheral surface and a top surface of an upper end portion of the winding,
the discharge port is provided toward the inner upper surface at the inner peripheral surface of the upper case,
the coolant oil passage includes an annular oil passage provided around the discharge port and a communicating oil passage configured to communicate the annular oil passage with the discharge port,
the inner upper surface of the upper case is a first upper surface,
the upper case includes a case member and a plate member,
the case member includes the first upper surface, the inner peripheral surface, and a second upper surface extending radially outward of the inner peripheral surface at a lower level than the first upper surface,
the plate member is attached to the second upper surface, and
the annular oil passage, the communicating oil passage and the discharge port are formed between the second upper surface and the plate member.

2. The cooling apparatus according to claim 1, wherein the case member includes a chamfer at an end portion on an inner diameter side of the second upper surface, and the plate member includes an inclined surface parallel to the chamfer at an end portion on an inner diameter side thereof.

3. The cooling apparatus according to claim 1, wherein the inner upper surface of the upper case facing the top surface of the winding includes a sloped surface sloped toward a center portion of a thickness in a radial direction of the top surface of the winding.

4. The cooling apparatus according to claim 1, wherein the stator includes a projection projected above the top surface of the winding along a peripheral surface at a boundary between the stator and the rotor.

5. The cooling apparatus according to claim 1, wherein
a top surface of the dynamoelectric machine is located below an axial line connecting rotation centers of left and right drive wheels of the vehicle so that the dynamoelectric machine drives the left and right drive wheels.

6. The cooling apparatus according to claim 1, further comprising a rotating member extended along the axial line of rotation so as to rotate integrally with the rotor, wherein
the rotating member includes a gear at an upper end portion thereof.

7. The cooling apparatus according to claim 6, wherein
the rotating member is a first rotating member,
the gear is a first bevel gear,
the cooling apparatus further comprises a second rotating member extended along a horizontal direction, and
the second rotating member includes a second bevel gear engaged with the first bevel gear.

8. The cooling apparatus according to claim 6, further comprising a planetary gear mechanism including a sun gear provided around the rotating member so as to rotate integrally with the rotor, a ring gear provided around the sun gear and fixed to the case, planetary gears provided between the sun gear and the ring gear, and a carrier provided integrally and rotatably with the rotating member so as to support rotatably the planetary gears.

* * * * *